(12) United States Patent
Ganlath et al.

(10) Patent No.: US 12,321,179 B2
(45) Date of Patent: Jun. 3, 2025

(54) SYSTEM AND METHODS FOR PLATOON-LEADER-AS-A-SERVICE

(71) Applicant: Toyota Motor Engineering & Manufacturing North America, Inc., Plano, TX (US)

(72) Inventors: Akila C. Ganlath, Agua Dulce, CA (US); Nejib Ammar, San Jose, CA (US); Prashant Tiwari, Santa Clara, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 338 days.

(21) Appl. No.: 17/161,868

(22) Filed: Jan. 29, 2021

(65) Prior Publication Data

US 2022/0244743 A1    Aug. 4, 2022

(51) Int. Cl.
*G05D 1/00* (2024.01)
*G05D 1/69* (2024.01)
(Continued)

(52) U.S. Cl.
CPC ......... *G05D 1/0295* (2013.01); *G05D 1/0293* (2013.01); *G05D 1/69* (2024.01);
(Continued)

(58) Field of Classification Search
CPC . G05D 1/0295; G05D 1/0293; G06Q 30/0283
See application file for complete search history.

(56) References Cited

U.S. PATENT DOCUMENTS 9,141,112 B1 *   9/2015  Loo ................. G08G 1/096838
10,380,898 B1 *  8/2019  Schubert ............... B60L 53/305
(Continued)

FOREIGN PATENT DOCUMENTS

CN    111062666 A  *  4/2020
DE    102014002115 A1 *  8/2015  ............ B60W 30/17
(Continued)

OTHER PUBLICATIONS

C. Chen, T. Xiao, T. Qiu, N. Lv and Q. Pei, "Smart-Contract-Based Economical Platooning in Blockchain-Enabled Urban Internet of Vehicles," in IEEE Transactions on Industrial Informatics, vol. 16, No. 6, pp. 4122-4133, Jun. 2020, doi: 10.1109/TII.2019.2954213. (Year: 2020).*

(Continued)

*Primary Examiner* — Jelani A Smith
*Assistant Examiner* — Jacob Daniel Underbakke
(74) *Attorney, Agent, or Firm* — DINSMORE & SHOHL LLP

(57) ABSTRACT

A method includes receiving requests to form a vehicle platoon from a plurality of vehicles, determining terms of a contract for the plurality of vehicles to form the vehicle platoon comprising a lead vehicle and one or more follower vehicles, and transmitting terms of the contract to the plurality of vehicles. The terms of the contract comprise the lead vehicle receiving a first payment, at least one of the follower vehicle making a second payment, and each of the follower vehicles receiving vehicle data from the lead vehicle according to a unique service profile associated with each follower vehicle.

19 Claims, 12 Drawing Sheets

(51) Int. Cl.
  *G05D 1/695* (2024.01)
  *G06Q 30/0283* (2023.01)
  *G06Q 50/18* (2012.01)
  *H04W 4/46* (2018.01)

(52) U.S. Cl.
  CPC ......... *G05D 1/695* (2024.01); *G06Q 30/0283* (2013.01); *G06Q 50/188* (2013.01); *H04W 4/46* (2018.02)

(56) References Cited

U.S. PATENT DOCUMENTS

| | | | |
|---|---|---|---|
| 11,097,735 B1 * | 8/2021 | Marasigan | G08G 1/096716 |
| 2003/0182183 A1 | 9/2003 | Pribe | |
| 2010/0256852 A1 * | 10/2010 | Mudalige | G08G 1/164 701/24 |
| 2014/0244144 A1 | 8/2014 | You | |
| 2016/0191637 A1 * | 6/2016 | Memon | G06Q 50/01 709/204 |
| 2017/0284816 A1 * | 10/2017 | Greenspan | G01C 21/3492 |
| 2017/0349176 A1 * | 12/2017 | Alden | G05D 1/0293 |
| 2018/0084511 A1 * | 3/2018 | Wu | H04W 4/46 |
| 2018/0188746 A1 * | 7/2018 | Lesher | G05D 1/0287 |
| 2018/0211546 A1 * | 7/2018 | Smartt | H04W 4/46 |
| 2018/0279096 A1 * | 9/2018 | Wu | G08G 1/22 |
| 2018/0348791 A1 * | 12/2018 | Hendrickson | G05D 1/0293 |
| 2018/0366005 A1 * | 12/2018 | Seenumani | B61L 15/0018 |
| 2019/0080373 A1 | 3/2019 | Takoshima et al. | |
| 2019/0220037 A1 * | 7/2019 | Vladimerou | G08G 1/22 |
| 2019/0258270 A1 * | 8/2019 | Yamamuro | G05D 1/0297 |
| 2019/0339716 A1 | 11/2019 | Kopischke | |
| 2019/0378418 A1 * | 12/2019 | Menadue | H04W 4/46 |
| 2019/0383638 A1 * | 12/2019 | Cho | G05D 1/0295 |
| 2019/0385462 A1 * | 12/2019 | Kim | H04W 4/46 |
| 2020/0150684 A1 * | 5/2020 | Kim | G08G 1/22 |
| 2020/0175880 A1 | 6/2020 | Brahim et al. | |
| 2020/0233437 A1 * | 7/2020 | Hase | H04W 4/40 |
| 2020/0286387 A1 * | 9/2020 | Zhou | G08G 1/0175 |
| 2020/0302563 A1 * | 9/2020 | Golway | G06Q 50/188 |
| 2020/0339124 A1 * | 10/2020 | Vassilovski | G08G 1/161 |

FOREIGN PATENT DOCUMENTS

| | | | | |
|---|---|---|---|---|
| DE | 102019210559 A1 * | 10/2020 | | |
| EP | 3051258 A2 * | 8/2016 | ......... | G01C 21/3438 |
| EP | 3525157 A1 * | 8/2019 | | |
| EP | 3591637 A1 * | 1/2020 | | |
| EP | 3690844 A1 * | 8/2020 | | |
| FR | 3054917 A1 * | 2/2018 | | |
| JP | 2019179322 A * | 10/2019 | | |
| WO | WO-2013143621 A1 * | 10/2013 | | |
| WO | WO-2015047178 A1 * | 4/2015 | | |
| WO | WO-2017209124 A1 * | 12/2017 | | |
| WO | WO-2018035145 A1 * | 2/2018 | .......... | B60W 30/165 |
| WO | WO-2019222654 A1 * | 11/2019 | | |
| WO | WO-2020173499 A1 * | 9/2020 | | |

OTHER PUBLICATIONS

B. Ledbetter, S. Wehunt, M. A. Rahman and M. H. Manshaei, "LIPs: A Protocol for Leadership Incentives for Heterogeneous and Dynamic Platoons," 2019 IEEE 43rd Annual Computer Software and Applications Conference (COMPSAC), Milwaukee, WI, USA, 2019, pp. 535-544, doi: 10.1109/COMPSAC.2019.00082. (Year: 2019).*

Z. Ying, M. Ma and L. Yi, "BAVPM: Practical Autonomous Vehicle Platoon Management Supported by Blockchain Technique," 2019 4th International Conference on Intelligent Transportation Engineering (ICITE), Singapore, 2019, pp. 256-260, doi: 10.1109/ICITE 2019.8880167. (Year: 2019).*

J. Erickson, S. Chen, M. Savich, S. Hu and Z. M. Mao, "CommPact: Evaluating the Feasibility of Autonomous Vehicle Contracts," 2018 IEEE Vehicular Networking Conference (VNC), Taipei, Taiwan, 2018, pp. 1-8, doi: 10.1109/VNC.2018.8628319. (Year: 2018).*

C. Chen, J. Jiang, N. Lv and S. Li, "An Intelligent Path Planning Scheme of Autonomous Vehicles Platoon Using Deep Reinforcement Learning on Network Edge," in IEEE Access, vol. 8, pp. 99059-99069, 2020, (Year: 2020).*

Dongliang Su and Sanghyun Ahn, International Journal of Distributed Sensor Networks, "In-Vehicle Sensor-Assisted Platoon Formation by Utilizing Vehicular Communications", 20 pages, Nov. 5, 2020, https://journals.sagepub.com/doi/full/10.1177/1550147717718756.

* cited by examiner

SYSTEM AND METHODS FOR PLATOON-LEADER-AS-A-SERVICE

TECHNICAL FIELD

The present specification relates to a traffic management system and more particularly to a system and methods for platoon-leader-as-a-service.

BACKGROUND

As vehicles drive along a road, air resistance creates drag, which causes vehicles to lose fuel efficiency. This can be exacerbated in challenging weather environments (e.g., windy conditions), though even in ideal conditions, there is a natural air resistance or drag that occurs as vehicles drive through space. However, as a vehicle drives along a road, the vehicle may create a turbulent flow behind it, thereby creating a slipstream that has lower pressure than its ambient surroundings. As such, if one vehicle drives directly behind another vehicle in this slipstream, the follower vehicle may experience lower drag, and consequently, improved fuel efficiency. Furthermore, a plurality of vehicles may drive closely together in a platoon formation in order to improve fuel efficiency for multiple vehicles in the platoon following the lead vehicle of the platoon.

However, while the follower vehicles in a vehicle platoon receive the benefit of being part of the platoon, the lead vehicle of the platoon does not receive any such benefits. As such, vehicles may have no incentive to lead a vehicle platoon unless the lead vehicle and the follower vehicles are owned and/or controlled by the same entity (e.g., part of a vehicle fleet owned by the same company). Therefore, a need exists for a system to allow for platoon-leader-as-a-service.

SUMMARY

In an embodiment, a method may include receiving requests to form a vehicle platoon from a plurality of vehicles, determining terms of a contract for the plurality of vehicles to form the vehicle platoon comprising a lead vehicle and one or more follower vehicles, and transmitting terms of the contract to the plurality of vehicles. The terms of the contract may include the lead vehicle receiving a first payment, at least one of the follower vehicles making a second payment, and each of the follower vehicles receiving vehicle data from the lead vehicle according to a unique service profile associated with each follower vehicle.

In another embodiment, a server may include a controller configured to receive requests to form a vehicle platoon from a plurality of vehicles, determine terms of a contract for the plurality of vehicles to form the vehicle platoon comprising a lead vehicle and one or more follower vehicles, and transmit terms of the contract to the plurality of vehicles. The terms of the contract may include the lead vehicle receiving a first payment, at least one of the follower vehicles making a second payment, and each of the follower vehicles receiving vehicle data from the lead vehicle according to a unique service profile associated with each follower vehicle.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 4:
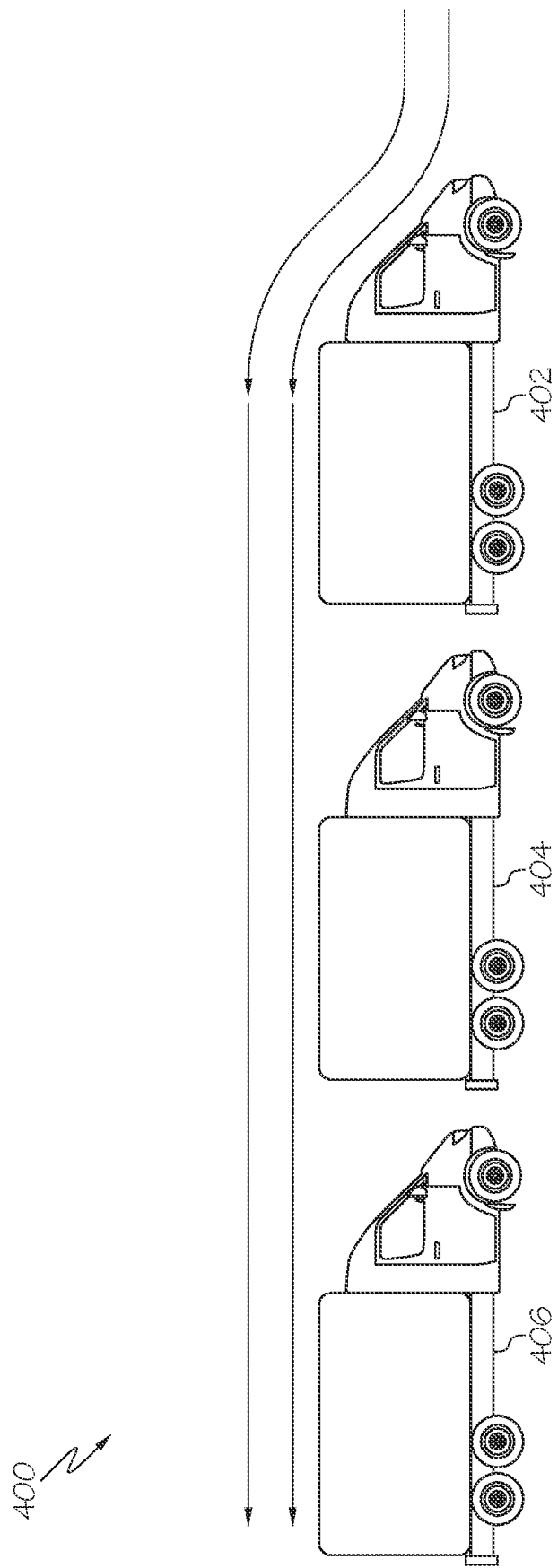
FIG. 4 illustrates a vehicle platoon where the vehicles are operated by the same entity.

The advent of autonomous vehicles and vehicle features such as cooperative adaptive cruise control (C-ACC) may allow a plurality of vehicles to drive closely together in a platoon formation. When vehicles drive along a road in a platoon formation (e.g., a lead vehicle in the front of the platoon followed closely by one or more follower vehicles directly behind one another), the follower vehicles may enjoy improved fuel efficiency due to driving in the slipstream created by the vehicle in front of them, as illustrated in FIG. 4. However, the lead vehicle does not enjoy these benefits since there is no vehicle in front of the lead vehicle to create a slipstream to follow.

As such, if a single entity owns or operates a plurality of vehicles, it may make sense for these vehicles to form a platoon while driving together. In the example of FIG. 4, the vehicles 402, 404, and 406 are owned and operated by a single company and may form platoon with vehicle 402 leading the platoon and vehicles 404 and 406 as follower vehicles. The follower vehicles 404 and 406 in the platoon 400 may enjoy increased fuel efficiency, which may save money for the owner or operator of the vehicles 402, 404, and 406. The fact that the lead vehicle 402 does not enjoy any increased fuel efficiency should not deter the vehicles from forming the platoon since the single owner of the vehicles will enjoy the benefits of the platoon.

Figure 5:
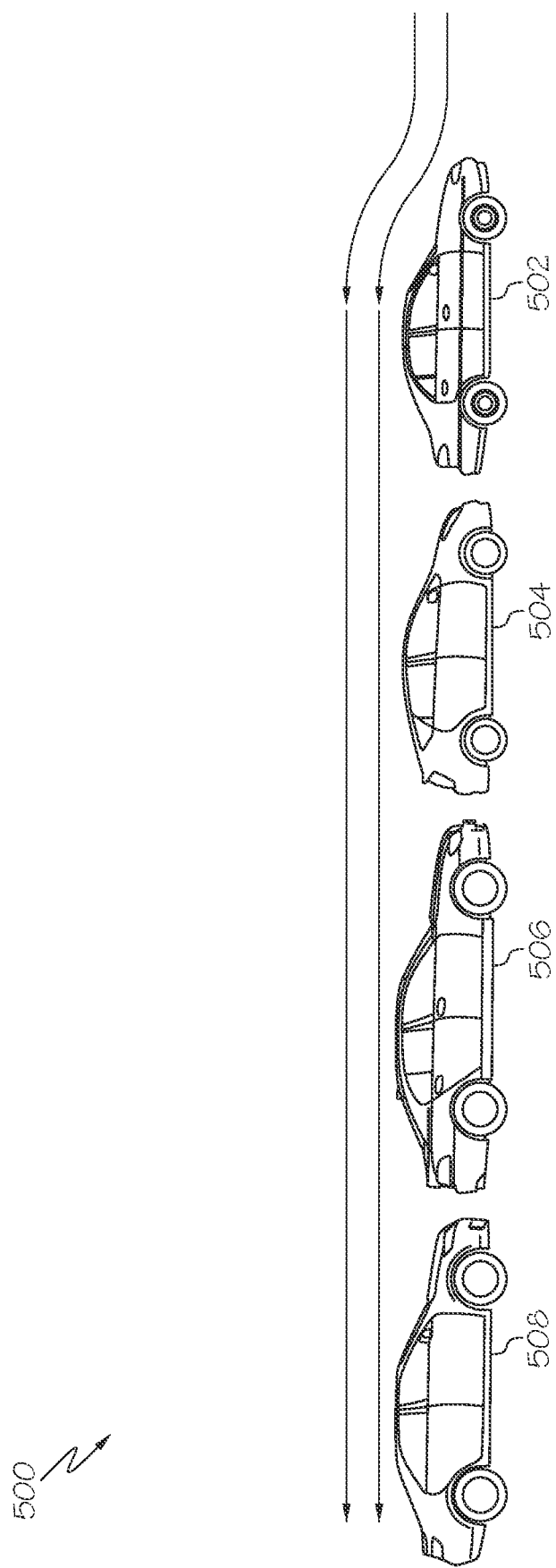
FIG. 5 illustrates a vehicle platoon where the vehicles are operated by different entities.
Figure 6:
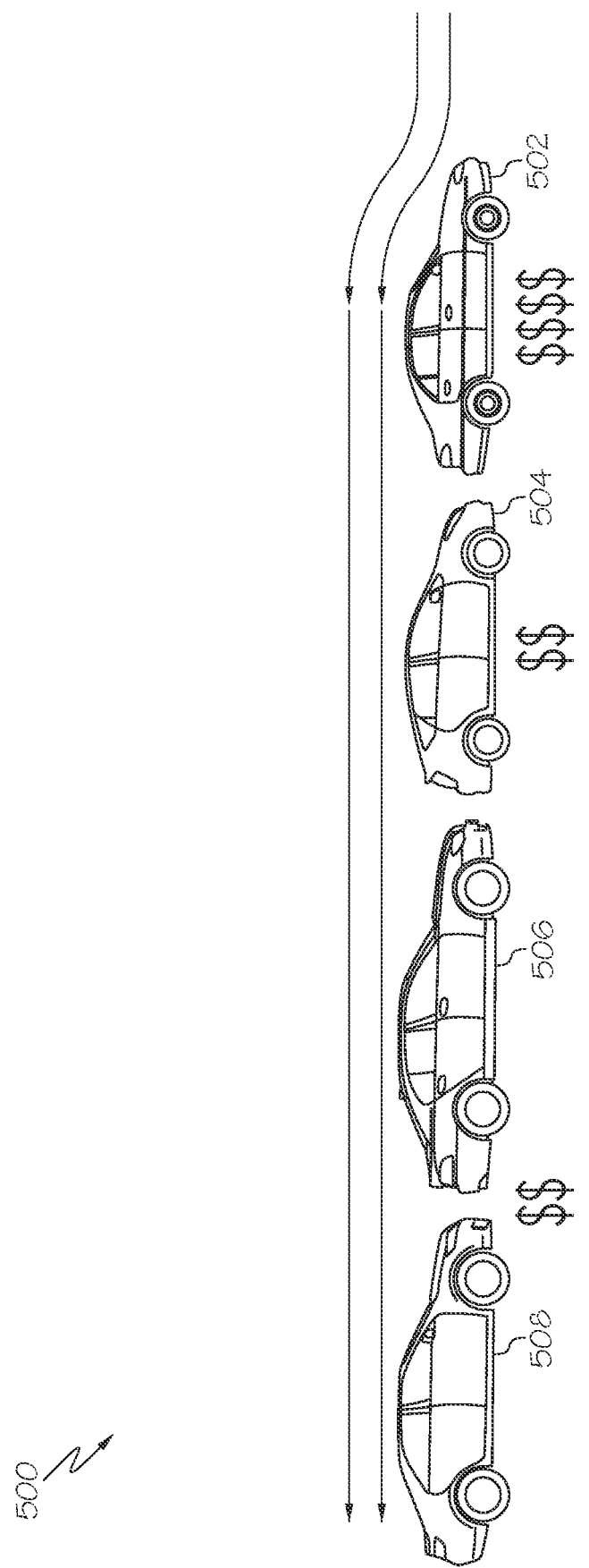
FIG. 6 illustrates costs associated with a vehicle platoon.

However, if multiple vehicles unrelated to each other are driving along a road, there may be no incentive for the vehicles to form a platoon. For example, FIG. 5 illustrates a vehicle platoon 500 comprising vehicles 502, 504, 506, and 508. In the example of FIG. 5, follower vehicles 504, 506, 508 may enjoy increased fuel efficiency by driving in the slipstream created by lead vehicle 502. However, the lead vehicle 502 does not enjoy any benefits from leading the platoon 500. Furthermore, the lead vehicle may incur increased costs (e.g., costs of transmitting data to the other vehicles in the platoon). Thus, the follower vehicles 504, 506, and 508 may be saving money at the expense of the lead vehicle 502, as illustrated in FIG. 6. Therefore, while there is an incentive to join a vehicle platoon as a follower vehicle, there may be no incentive to join a vehicle platoon as the lead vehicle. As such, a platoon is unlikely to be formed, even though it may be beneficial to the vehicles as a whole.

Accordingly, disclosed herein is a system and methods for implementing platoon-leader-as-a-service. This may allow for a vehicle to offer to serve as a lead vehicle of a vehicle platoon in exchange for compensation. Other vehicles on the road may then agree to join the platoon as follower vehicles and pay the platoon leader accordingly. As such, all parties are incentivized to join the platoon. The follower vehicles may incur a benefit if the cost of joining the platoon is less than the money they save due to increased fuel efficiency, and the lead vehicle may incur the benefit of being directly paid for being the platoon leader.

Figure 7:
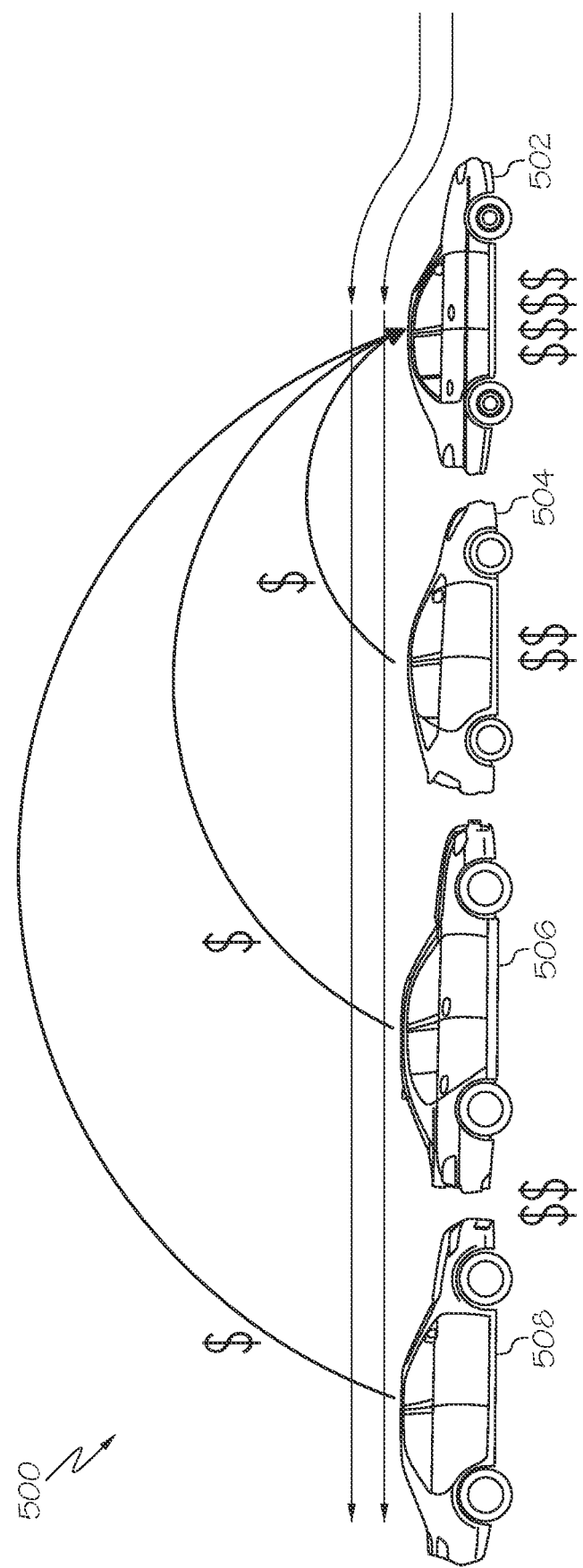
FIG. 7 illustrates a vehicle platoon wherein follower vehicles make a payment to a lead vehicle.

As disclosed herein, a server may facilitate the creation of a contract between a lead vehicle and one more follower vehicles in the creation of a vehicle platoon. The lead vehicle may agree to serve as platoon leader in exchange for compensation and the one or more follower vehicles may agree to pay the lead vehicle in order to join a vehicle platoon. Once a contract is established, the vehicles may form the vehicle platoon. The platoon may be established and maintained through communication between the vehicles. The edge server may facilitate payment from the follower vehicles to the lead vehicle, as illustrated in FIG. 7. In some examples, the edge server may also facilitate communication between the vehicles. Accordingly, a vehicle platoon may be established in a way that benefits all participants of the platoon.

Figure 1:
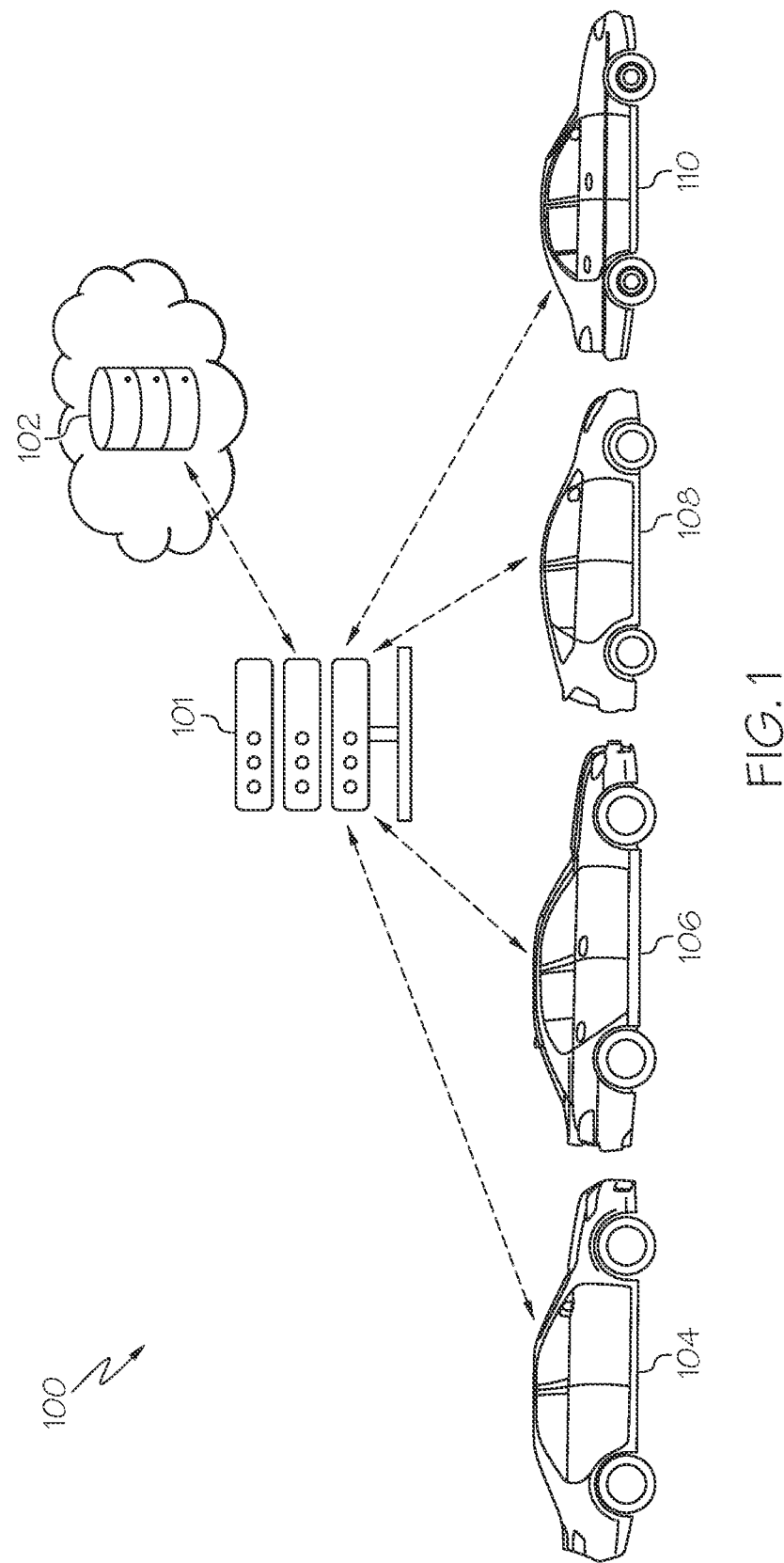
FIG. 1 schematically depicts a system for platoon-leader-as-a-service, according to one or more embodiments shown and described herein.

Referring now to FIG. 1, a system for platoon-leader-as-a-service is schematically depicted. A system 100 includes an edge server 101 and a cloud server 102. The edge server 101 may be communicatively coupled to the cloud server 102 and to one or more connected vehicles, as disclosed herein. In the example of FIG. 1, vehicles 104, 106, 108, 110 drive along a road and are communicatively coupled to the edge server 101. In the example of FIG. 1, four vehicles are shown. However, it should be understood that in other examples, any number of vehicles may be included.

In the example of FIG. 1, the vehicles 104, 106, 108, and 110 are autonomous vehicles. Autonomous vehicles may be able to more easily maintain a vehicle platoon than human-driven vehicles. In particular, a vehicle platoon is more effective the closer together the vehicles drive. That is, the slipstream created by a leading vehicle is strongest directly behind the vehicle. As such, the closer a follower vehicle is able to follow the leading vehicle, the greater the increase in performance (e.g., fuel efficiency) may be. However, it may be challenging for a human driver to safely follow a vehicle in front of them at close range. Autonomous vehicles, though, may be able to closely follow each other; particularly through the use of technologies such as C-ACC.

Cooperative adaptive cruise control allows an autonomous vehicle to use sensor data along with data received from other vehicles to autonomously drive in traffic (e.g., maintaining a fixed distance from another vehicle). By utilizing C-ACC, autonomous vehicles may establish and maintain vehicle platoons with relatively small distances between the vehicles, thereby increasing the benefits of the platoons.

In the example of FIG. 1, the vehicles 104, 106 108, and 110 are connected vehicles. That is, the vehicles 104, 106 108, 110 may be communicatively coupled to the edge server 101 and/or each other. The vehicles 104, 106, 108, 110 may communicate via vehicle-to-vehicle (V2V) communication, vehicle-to-everything (V2X) communication, or other forms of communication.

The vehicles 104, 106 108, 110 may be unrelated to each other. That is, the owners and/or the drivers of the vehicles 104, 106 108, 110 need not know each other or plan ahead to establish a vehicle platoon. As disclosed herein, the system 100 allows vehicle platoons to be established at any time, while vehicles are driving.

The edge server 101 may be communicatively coupled to one or more of the vehicles 104, 106, 108, 110. The edge server 101 may also be communicatively coupled to the cloud server 102. In some examples, the edge server 101 may be a road-side unit (RSU) positioned near a road. In these examples, the system 100 may include any number of RSUs spaced along one or more roads such that each RSU covers a different service area. That is, as the vehicles 104, 106, 108, 110 drive along one or more roads, the vehicles may be in range of different RSUs at different times such that different RSUs provide coverage at different locations. Thus, as the vehicles 104, 106, 108, 110 drive along one or more roads, the vehicles may move between coverage areas of different RSUs.

In other examples, the edge server 101 may be another type of server or computing device and may be positioned remotely from any roads and/or vehicles. In some examples, the edge server 101 may be a moving edge server, such as another vehicle. In the illustrated example, the edge server 101 may be a cloud-based server. However, in other examples, the edge server 101 may be any other type of computing device.

In the illustrated example, the cloud server 102 is a cloud-based server. However, in other examples, the cloud server 102 may be any other type of computing device. In the illustrated example, the cloud server 102 may store account information and other data as described in further detail below.

As a vehicle drives along a road, the vehicle may transmit a message to the edge server 101 indicating that the vehicle would like to join a vehicle platoon. This message may be sent after a driver of the vehicle indicates that the driver would like to join a platoon (e.g., by pressing a button in the vehicle or turning on a C-ACC system). When the edge server 101 has received messages from multiple vehicles within the vicinity of each other (e.g., within a predetermined threshold distance) indicating that each of the vehicles would like to join a vehicle platoon, the edge server 101 may automatically negotiate a contract between the interested vehicles, as disclosed herein.

Once a contract is established between two or more vehicles regarding the establishment of a vehicle platoon, the edge server 101 may transmit contract details to the participating vehicles. The edge server 101 may then facilitate payment of fees specified in the contract between the participating vehicles. The participating vehicles may then establish and maintain a platoon according to the agreed upon contract. The platoon may be established and maintained by utilizing C-ACC or other communication systems between the vehicles, as disclosed herein.

Figure 2:
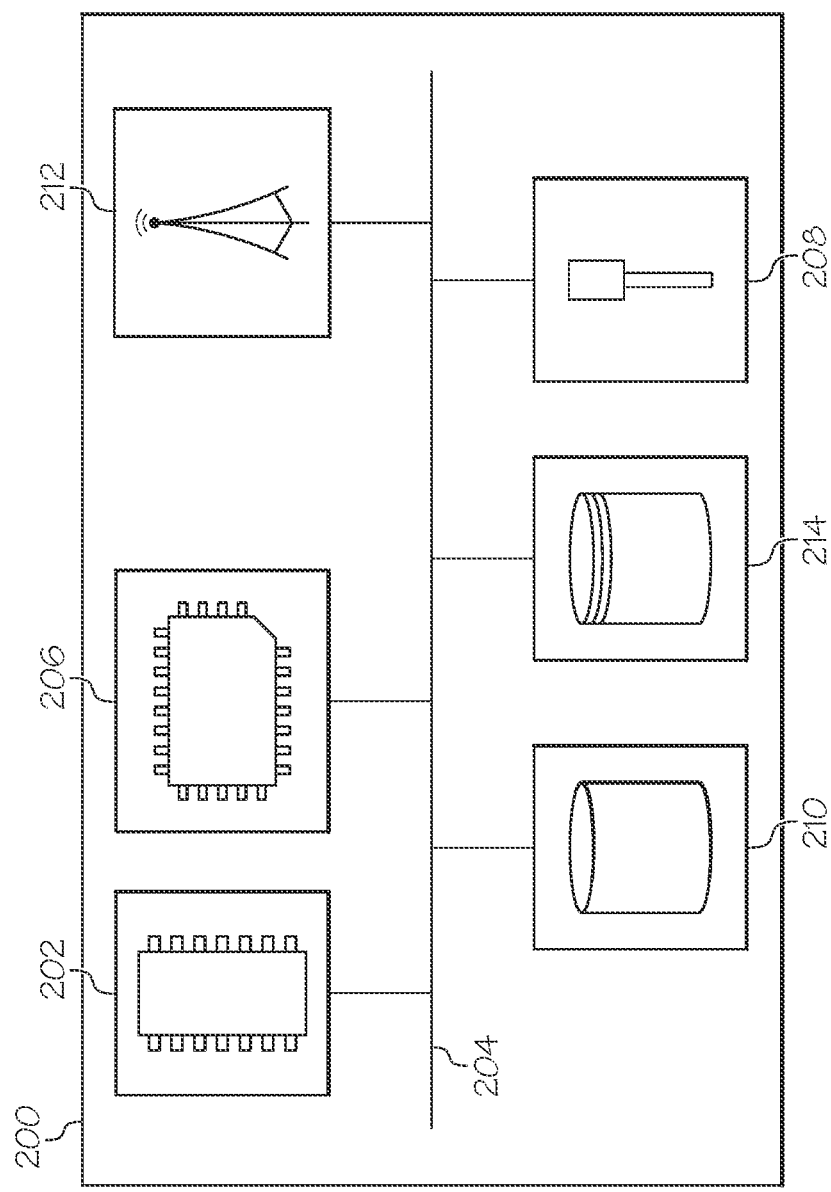
FIG. 2 depicts a schematic diagram of a vehicle system, according to one or more embodiments shown and described herein.

FIG. 2 depicts a vehicle system 200 that may be included in the vehicles 104, 106, 108 and 110 of FIG. 1. The vehicle system 200 includes one or more processors 202, a communication path 204, one or more memory modules 206, a satellite antenna 208, one or more vehicle sensors 210, a network interface hardware 212, and a data storage component 214, the details of which will be set forth in the following paragraphs.

Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring still to FIG. 2, the vehicle system 200 comprises a satellite antenna 208 coupled to the communication path 204 such that the communication path 204 communicatively couples the satellite antenna 208 to other modules of the vehicle system 200. The satellite antenna 208 is configured to receive signals from global positioning system satellites. Specifically, in one embodiment, the satellite antenna 208 includes one or more conductive elements that interact with electromagnetic signals transmitted by global positioning system satellites. The received signal is transformed into a data signal indicative of the location (e.g., latitude and longitude) of the satellite antenna 208, and consequently, the vehicle containing the vehicle system 200.

The vehicle system 200 comprises one or more vehicle sensors 210. Each of the one or more vehicle sensors 210 is coupled to the communication path 204 and communicatively coupled to the one or more processors 202. The one or more sensors 210 may include, but are not limited to, LiDAR sensors, RADAR sensors, optical sensors (e.g., cameras, laser sensors, proximity sensors, location sensors (e.g., GPS modules)), and the like. In embodiments, the sensors 210 may monitor the surroundings of the vehicle and may detect other vehicles and/or traffic infrastructure.

The vehicle system 200 may include an autonomous driving module (not shown), and the data gathered by the sensors 210 may be used by the autonomous driving module to autonomously navigate the vehicle. The data gathered by the sensors 210 may also be used to perform C-ACC. In particular, once a contract has been established between two or more vehicles to create a vehicle platoon, the vehicles to join the platoon may exchange C-ACC messages and the autonomous driving modules of the vehicles may utilize sensor data and C-ACC messages to establish and form the platoon. The C-ACC information exchanged between vehicles may include information about a vehicle's speed, heading, acceleration, and other information related to a vehicle state. In some examples, the C-ACC information exchanged between vehicles may comprise a basic safety message (BSM). The formation and maintenance of vehicle platoons is discussed in further detail below.

Still referring to FIG. 2, the vehicle system 200 comprises network interface hardware 212 for communicatively coupling the vehicle system 200 to the edge server 101 and/or other vehicles. The network interface hardware 212 can be communicatively coupled to the communication path 204 and can be any device capable of transmitting and/or receiving data via a network or other communication mechanisms. Accordingly, the network interface hardware 212 can include a communication transceiver for sending and/or receiving any wired or wireless communication. For example, the network interface hardware 212 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 212 includes hardware configured to operate in accordance with the Bluetooth® wireless communication protocol.

In embodiments, the network interface hardware 212 of the vehicle system 200 may transmit a request to join a vehicle platoon to the edge server 101. The network interface hardware 212 may also receive contract details from the edge server 101. The network interface hardware 212 may also transmit and receive C-ACC data to and from other vehicles.

Still referring to FIG. 2, the vehicle system 200 comprises a data storage component 214. The data storage component 214 may store data used by various components of the vehicle system 200. In addition, the data storage component 214 may store data gathered by the sensors 210, received from the edge server 101, and/or received from other vehicles.

The vehicle system 200 may also include an interface (not shown). The interface may allow for data to be presented to a human driver and for data to be received from the driver. For example, the interface may include a screen to display information to a driver, speakers to present audio information to the driver, and a touch screen that may be used by the driver to input information. In other examples, the vehicle system 200 may include other types of interfaces.

In some embodiments, the vehicle system 200 may be communicatively coupled to the edge server 101 by a network (not shown). In one embodiment, the network may include one or more computer networks (e.g., a personal area network, a local area network, or a wide area network), cellular networks, satellite networks and/or a global positioning system and combinations thereof. Accordingly, the vehicle system 200 can be communicatively coupled to the network via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Figure 3:
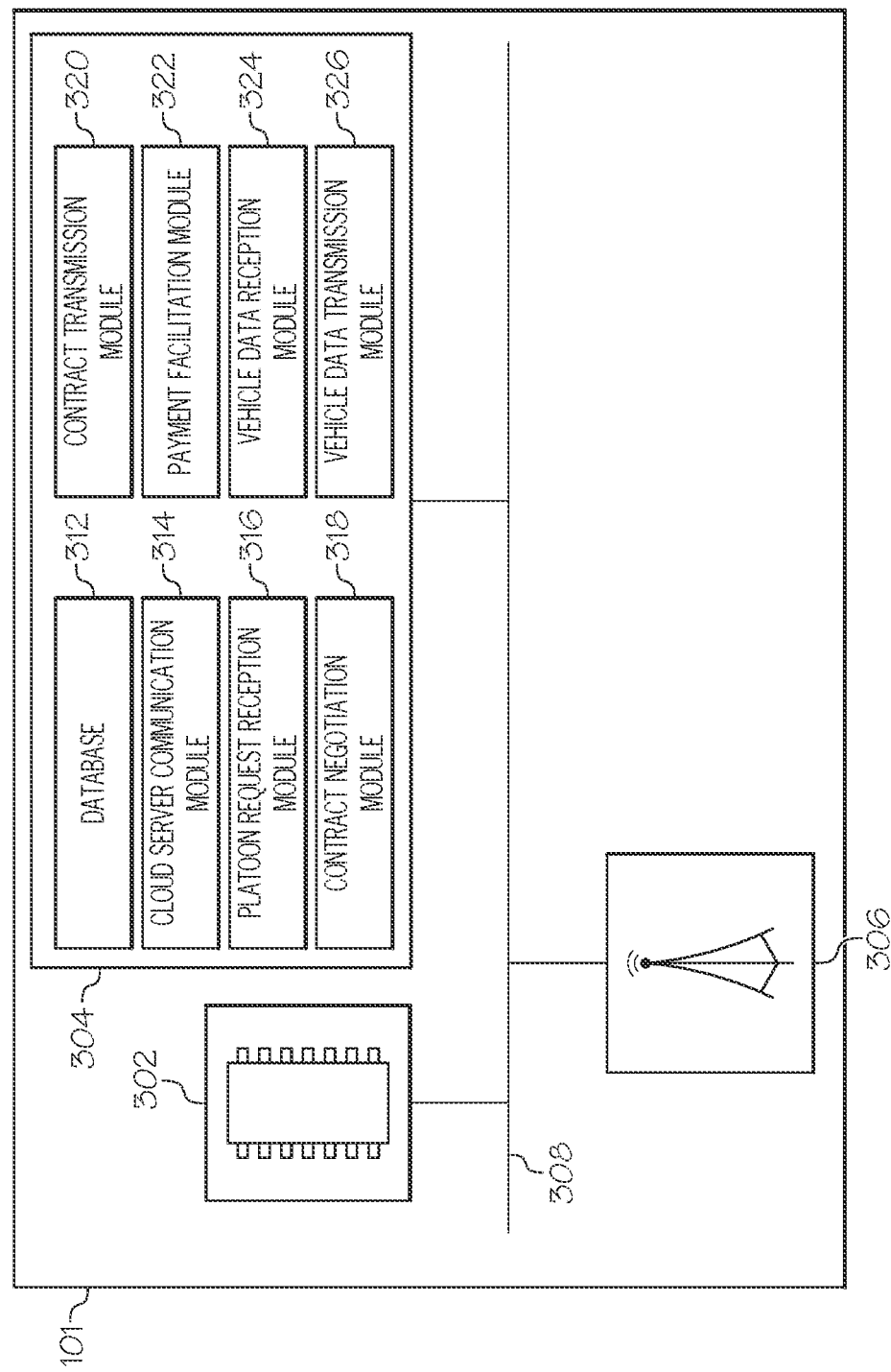
FIG. 3 depicts a schematic diagram of the edge server of FIG. 1, according to one or more embodiments shown and described herein.

Now referring to FIG. 3, the edge server 101 comprises one or more processors 302, one or more memory modules 304, network interface hardware 306, and a communication path 308. The one or more processors 302 may be a controller, an integrated circuit, a microchip, a computer, or any other computing device. The one or more memory modules 304 may comprise RAM, ROM, flash memories, hard drives, or any device capable of storing machine readable and executable instructions such that the machine readable and executable instructions can be accessed by the one or more processors 302.

The network interface hardware 306 can be communicatively coupled to the communication path 308 and can be any device capable of transmitting and/or receiving data via a network. Accordingly, the network interface hardware 306 can include a communication transceiver for sending and/or receiving any wired or wireless communication. For example, the network interface hardware 306 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 306 includes hardware configured to operate in accordance with the Bluetooth® wireless communication protocol. The network interface hardware 306 of the edge server 101 may transmit and receive data to and from connected vehicles (e.g., vehicles 104, 106, 108 of FIG. 1) and the cloud server 102.

The one or more memory modules 304 include a database 312, a cloud server communication module 314, a platoon request reception module 316, a contract negotiation module 318, a contract transmission module 320, a payment facilitation module 322, a vehicle data reception module 324, and a vehicle data transmission module 326. Each of the database 312, the cloud server communication module 314, the platoon request reception module 316, the contract negotiation module 318, the contract transmission module 320, the payment facilitation module 322, the vehicle data reception module 324, and the vehicle data transmission module 326 may be a program module in the form of operating systems, application program modules, and other program modules stored in one or more memory modules 304. In some embodiments, the program module may be stored in a remote storage device that may communicate with the edge server 101. In some embodiments, one or more of the database 312, the cloud server communication module 314, the platoon request reception module 316, the contract negotiation module 318, the cloud, the contract transmission module 320, the payment facilitation module 322, the vehicle data reception module 324, and the vehicle data transmission module 326 may be stored in the one or more memory modules 206 of the vehicle system 200 of a vehicle or the cloud server 102. Such a program module may include, but is not limited to, routines, subroutines, programs, objects, components, data structures and the like for performing specific tasks or executing specific data types as will be described below.

The database 312 may store data received from vehicles and/or from the cloud server 102. The database 312 may also store other data that may be used by the memory modules 304 and/or other components of the edge server 101.

The cloud server communication module 314 may transmit data to the cloud server 102 and receive data from the cloud server 102. In particular, the cloud server communication module 314 may receive data from the cloud server 102 including account information associated with users, pricing models, and other information that may be used by the edge server 101 to negotiate contract, as explained in further detail below. Furthermore, the cloud server communication module 314 may transmit information about negotiated contracts to the cloud server 102 and the cloud server 102 may store this information for future use. Data transmitted to and/or received from the cloud server 102 by the cloud server communication module 314 is discussed in further detail below.

The platoon request reception module 316 may receive requests to join a vehicle platoon from one or more vehicles. As explained above, an autonomous connected vehicle may transmit a request to join a vehicle platoon to the edge server 101. This request may be received by the platoon request reception module 316. In embodiments, a driver or occupant of an autonomous connected vehicle may initiate a request to join a vehicle platoon through the vehicle system 200 of the vehicle (e.g., by pressing a button on an interface or turning on a C-ACC system), which may cause the vehicle to transmit the request to the edge server 101.

In some examples, a vehicle may transmit a request specifically to become a platoon leader or to become a follower vehicle in a platoon. In some examples, this may be determined based on settings associated with a user's profile or may be specified by a user when submitting the request. For example, in some embodiments, when a driver presses a button on an interface to indicate a desire to join a vehicle platoon, the interface may ask the driver whether they prefer to arrive at their destination in the shortest time or to minimize fuel cost. If the driver selects a preference to arrive in the shortest time, the vehicle system 200 may transmit a request to become a platoon leader. Alternatively, if the driver selects a preference to minimize fuel cost, the vehicle system 200 may transmit a request to the vehicle system 200 to become a follower vehicle in a platoon. In some examples, this preference may be set in a user profile that may be stored in the cloud server 102. This setting information may be transmitted from the cloud server 102 to the edge server 101 and received by the cloud server communication module 314.

Creating a vehicle platoon requires at least two vehicles. Thus, when the platoon request reception module 316 receives a platoon request from a single vehicle, a platoon is unable to be formed until a request to join the platoon is received from additional vehicles. Furthermore, if two vehicles both desire to join a platoon are located a substantial distance from each other, it may not be practical for the vehicles to form a platoon. Accordingly, when the platoon request reception module 316 receives a request from a vehicle to join a platoon, data associated with the request may be stored in the database 312. As additional requests are received from additional vehicles, data associated with these requests may also be stored in the database 312.

Once multiple platoon requests are received from multiple vehicles within a vicinity of each other, a platoon may be formed. Accordingly, the platoon request reception module 316 may determine whether requests to join a platoon have been received from multiple vehicles in the vicinity of each other (e.g., within a threshold distance of each other), at which point the edge server 101 may begin to negotiate a contract, as explained below.

Once the platoon request reception module 316 has received platoon requests from multiple vehicles within a threshold distance of each other, the contract negotiation module 318 may attempt to automatically negotiate a contract between the requesting vehicles, as explained herein. In some examples, the contract negotiation module 318 may begin negotiating a contract once platoon requests are received from two vehicles within a threshold distance from each other. In other examples, the contract negotiation module 318 may not begin negotiating a contract until platoon requests are received from additional vehicles (e.g., three or more vehicles) within a threshold distance from each other.

Because vehicles are typically driving when platoon requests are transmitted, it may be difficult for drivers to manually negotiate contracts with each other while driving. Furthermore, each party's self-interest may make it difficult for a group of drivers to collectively negotiate a contract that is beneficial to all parties. Accordingly, in embodiments, the contract negotiation module 318 may automatically negotiate a contract between vehicles requesting to join a vehicle platoon without requiring direct input from the drivers of the vehicles, as disclosed herein.

In one example, the contract negotiation module 318 determines an amount of money that each vehicle to be part of a vehicle platoon should pay or receive. The contract negotiation module 318 may determine these amounts based on a variety of factors including market conditions, environmental conditions, vehicle states, and the like. In one example, the contract negotiation module 318 may determine an amount of savings that each vehicle is expected to receive by joining the platoon (e.g., based on increased fuel efficiency). In determining the amount of savings that each vehicle is expected to receive, the contract negotiation module 318 may consider the fuel efficiency of each vehicle, fuel costs, and potential positions of each vehicle in the platoon. For example, vehicles positioned near the front of a vehicle platoon behind the lead vehicle may experience greater savings than vehicles further back in the platoon.

In some examples, the lead vehicle is paid an amount equal to the total amount of payments made by the follower vehicles. As such, the follower vehicles may pay the lead vehicle to compensate the lead vehicle for leading the platoon. In other examples, the lead vehicle may be paid less than the total amount of payments made by the follower vehicles, and the remaining amount paid by the follower vehicles may go to the operator of the system 100 as an administrative fee.

In one example, the contract negotiation module 318 may then determine an amount to be paid or received by each vehicle such that the expected net savings to each vehicle is the same. For example, the contract negotiation module 318 may determine that for a three vehicle platoon, the lead vehicle is not expected to receive any savings, the first follower vehicle is expected to save $2/hour and the second follower vehicle is expected to save $1/hour. In this example, the contract negotiation module 318 may determine that the first follower vehicle should pay $1/hour and the lead vehicle should receive $1/hour. Thus, the net savings of each vehicle in the platoon will be $1/hour and the benefits of the platoon will be shared equally among the three vehicles. In another example, the contract negotiation module 318 may determine an amount to be paid or received by each vehicle such that the total net savings to all of the vehicles is maximized, even if some vehicles receive more or less savings than other vehicles.

In the above example, payments are determined on a per hour basis. However, in other examples, payments may be determined based on another unit of time or may be a flat fee. In the above example, only fuel costs were considered. However, in other examples, the contract negotiation module 318 may also consider other costs (e.g., data communication costs for transmitting C-ACC messages).

In some examples, the contract negotiation module 318 may determine expected savings based on weather conditions. For example, on a particularly windy day, the benefits of joining a vehicle platoon may be greater than on a day without any wind. The contract negotiation module 318 may also consider other environmental factors, such as the type of road being driven or the speeds of the vehicles. For example, the benefits of joining a platoon may be greater the faster vehicles drive due to increased drag at higher speeds.

In some examples, the contract negotiation module 318 may determine an optimal arrangement of vehicles in the platoon to achieve maximum overall fuel efficiency. For example, a vehicle platoon may be more efficient if a particular vehicle is the lead vehicle of the platoon and if the follower vehicles are arranged in a particular order. The contract negotiation module 318 may determine an optimal arrangement of vehicles in a platoon based on a number of factors including fuel efficiency of each individual vehicle to join the platoon. In some examples, data about individual vehicles requesting to join a platoon (e.g., fuel efficiency) may be included in requests transmitted by the vehicles. In other examples, the cloud server communication module 314 may receive information about fuel efficiency of vehicles from the cloud server 102, which may store such information in user accounts.

In some examples, the contract negotiation module 318 may take certain constraints into account when negotiating a contract and/or determining an arrangement of vehicles in a platoon. For example, as explained above, certain vehicles may request to be a vehicle leader or a vehicle follower. Thus, the contract negotiation module 318 may determine an arrangement of vehicles in a platoon based on this information. For example, the contract negotiation module 318 may select a platoon leader from among a set of vehicles that have requested to be a platoon leader.

In some examples, certain vehicles may have constraints associated with payments to join a vehicle platoon. For example, a particular user associated with a particular vehicle may have a minimum amount they are willing to accept to become a leader of a vehicle platoon. Similarly, a particular user may have a maximum amount they are willing to pay to become a follower vehicle in a platoon. In some examples, these constraints may be stored in a profile associated with a user, which may be received by the cloud server communication module 314 from the cloud server 102.

When vehicles requesting to join a vehicle platoon have constraints associated with how much they are willing to pay and/or receive to join a platoon, the contract negotiation module 318 may attempt to negotiate a contract that satisfies all the constraints. If the contract negotiation module 318 is able to establish a contract that satisfies the constraints of all vehicles requesting to join a platoon, the contract negotiation module 318 may create the contract accordingly. Alternatively, if the contract negotiation module 318 is only able to establish a contract that satisfies the constraints of some of the vehicles requesting to join a platoon, then the contract negotiation module 318 may create a contract for a vehicle platoon including the vehicles whose constraints are satisfied, and the other vehicles whose constraints could not be satisfied may be left out of the contract and may not be included in the platoon.

In some examples, certain users may be willing to pay more to join a platoon with higher quality service. As discussed above, a vehicle platoon may be created and maintained by the lead vehicle of a platoon transmitting C-ACC data to the follower vehicles. The follower vehicles may adjust their driving behavior (e.g., speed, acceleration) based on the received C-ACC data. In order to maintain the platoon, the lead vehicle may continually transmit data at a particular frequency. As such, the follower vehicles may continually adjust their behavior as new C-ACC data is received.

Accordingly, if a follower vehicle receives data at a higher frequency, the follower vehicle may be able to better perform driving maneuvers while participating in the platoon. For example, if a follower vehicle receives data at a higher frequency, the follower vehicle may be able to more closely follow the lead vehicle due to receiving more accurate and timely information about the driving state of the lead vehicle. By following the lead vehicle more closely, the follower vehicle may achieve greater gains in fuel efficiency. As such, some users may be willing to pay more to receive C-ACC data at a higher frequency. In some examples, a profile associated with a user may indicate how much the user is willing to pay for C-ACC data at a variety of frequencies.

Accordingly, the contract negotiation module 318 may create a contract between vehicles to participate in a platoon where each follower vehicle in the platoon may have a unique service profile. For example, each follower vehicle may receive data from the lead vehicle at a different frequency. By creating a contract where each follower vehicle has a different service profile, the contract negotiation module 318 may have more flexibility in successfully creating a contract. That is, certain users that are not willing to pay as much as other users may still be included in the contract by agreeing to receive vehicle data at a lower rate, while other users that are willing to pay more to join the platoon may receive vehicle data at a higher rate.

Once the contract negotiation module 318 has created a contract for the establishment of a vehicle platoon, the contract transmission module 320 may transmit the terms of the contract to the participating vehicles. The details of the contract may include which vehicle will be the lead vehicle of the platoon, which vehicles will be the follower vehicles, and the arrangement of the follower vehicles in the platoon. The details of the contract may also include payment details (e.g., how much money the lead vehicle will receive to lead the platoon and how much money each of the follower vehicles will pay to join the platoon). The details of the contract may also include service profiles for each of the follower vehicles (e.g., what frequency of C-ACC data they will receive).

In some examples, after a vehicle receives the contract details, an interface of the vehicle may display the contract details to the driver and ask the driver to confirm that they would like to join the platoon with the agreed upon details. The driver may then confirm or reject the contract. In other examples, once a vehicle receives contract details regarding the formation of a vehicle platoon, the contract may be automatically accepted without further input by a driver of the vehicle. In these examples, users may agree to terms of service when creating an account that contracts are automatically accepted once they have been created by the edge server 101.

Figure 8:
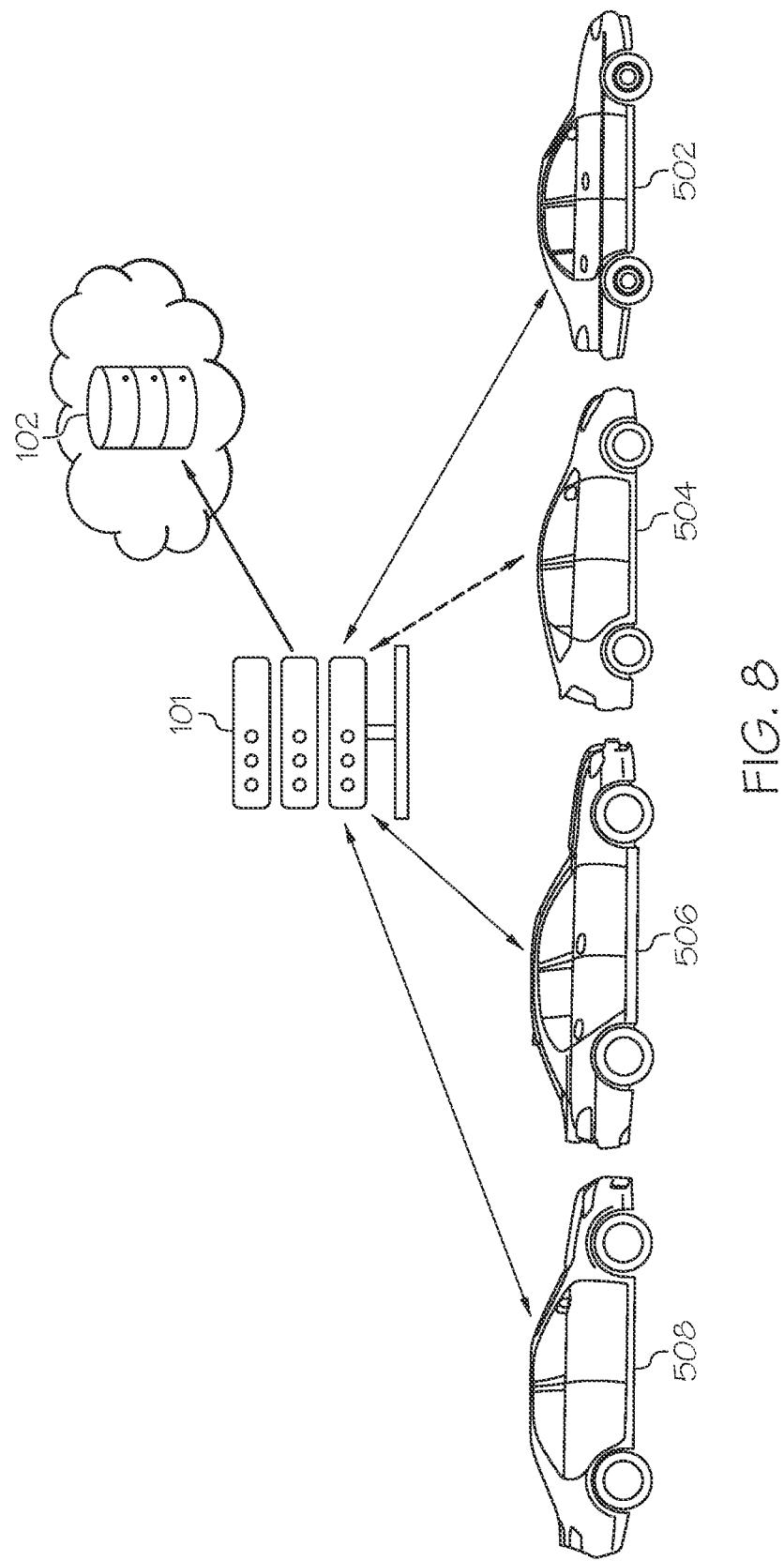
FIG. 8 illustrates vehicles attempting to negotiate a contract to form a vehicle platoon.

In examples, where contracts must be affirmatively accepted by each user, a contract only becomes effective when all parties to the contract have agreed to it. If one or more parties reject the proposed contract, the contract negotiation module 318 may attempt to negotiate a new contract without the involvement of any vehicles that rejected the previously created contract. For example, FIG. 8 illustrates a situation where a contract is attempted to be negotiated between the vehicles 502, 504, 506, and 508. In the example of FIG. 8, vehicle 502 is offering to be the lead vehicle of a platoon and vehicles 504, 506, and 508 are offering to join a vehicle platoon as follower vehicles. However, in the example of FIG. 8, the edge server 101 is only able to negotiate a contract between vehicles 502, 506, and 508. Thus, a contract may be created between these three vehicles to form a vehicle platoon.

Once all parties have agreed to a contract (or once a contract has been created, in examples where contracts are automatically accepted), the payment facilitation module 322 may facilitate payment among the vehicles participating in the vehicle platoon. That is, the payment facilitation module 322 may receive appropriate payments from each follower vehicle and make appropriate payments to the lead vehicle, according to the contract details. In some examples, users may establish accounts with the cloud server 102 that may store funds. In these examples, the payment facilitation module 322 may transmit a signal to the cloud server 102 that causes the cloud server 102 deduct or credit these accounts to facilitate the payments according to the contract details. In some examples, the payment facilitation module 322 may settle payments among the participants of a vehicle platoon in any other manner (e.g., by using a third party payment processor).

In embodiments, once a contract has been created and agreed to, the vehicles that have agreed to the contract may create the vehicle platoon. The vehicles may create the platoon in the order specified in the contract. In particular, the vehicle designated as the lead vehicle may transmit C-ACC data (e.g., a basic safety message) to each of the follower vehicles. The frequency at which each follower vehicle receives the C-ACC data from the lead vehicle may depend on the service profile for each follower vehicle specified in the contract. The follower vehicles may receive the C-ACC messages from the lead vehicle and may utilize the C-ACC messages to form the vehicle platoon. In the illustrated example, only the lead vehicle transmits C-ACC messages to the follower vehicles in the platoon. However, in other examples, one or more of the follower vehicles may also transmit C-ACC messages to the lead vehicle and/or one the other follower vehicles in the platoon.

In the illustrated example, once a contract for a platoon is agreed upon, the lead vehicle of the platoon transmits C-ACC messages to the edge server 101. These C-ACC messages may be received by the vehicle data reception module 324. The vehicle data transmission module 326 may then transmit the C-ACC messages to the follower vehicles of the platoon. However, in other examples, the lead vehicle may transmit C-ACC messages directly to the follower vehicles.

Figure 9:
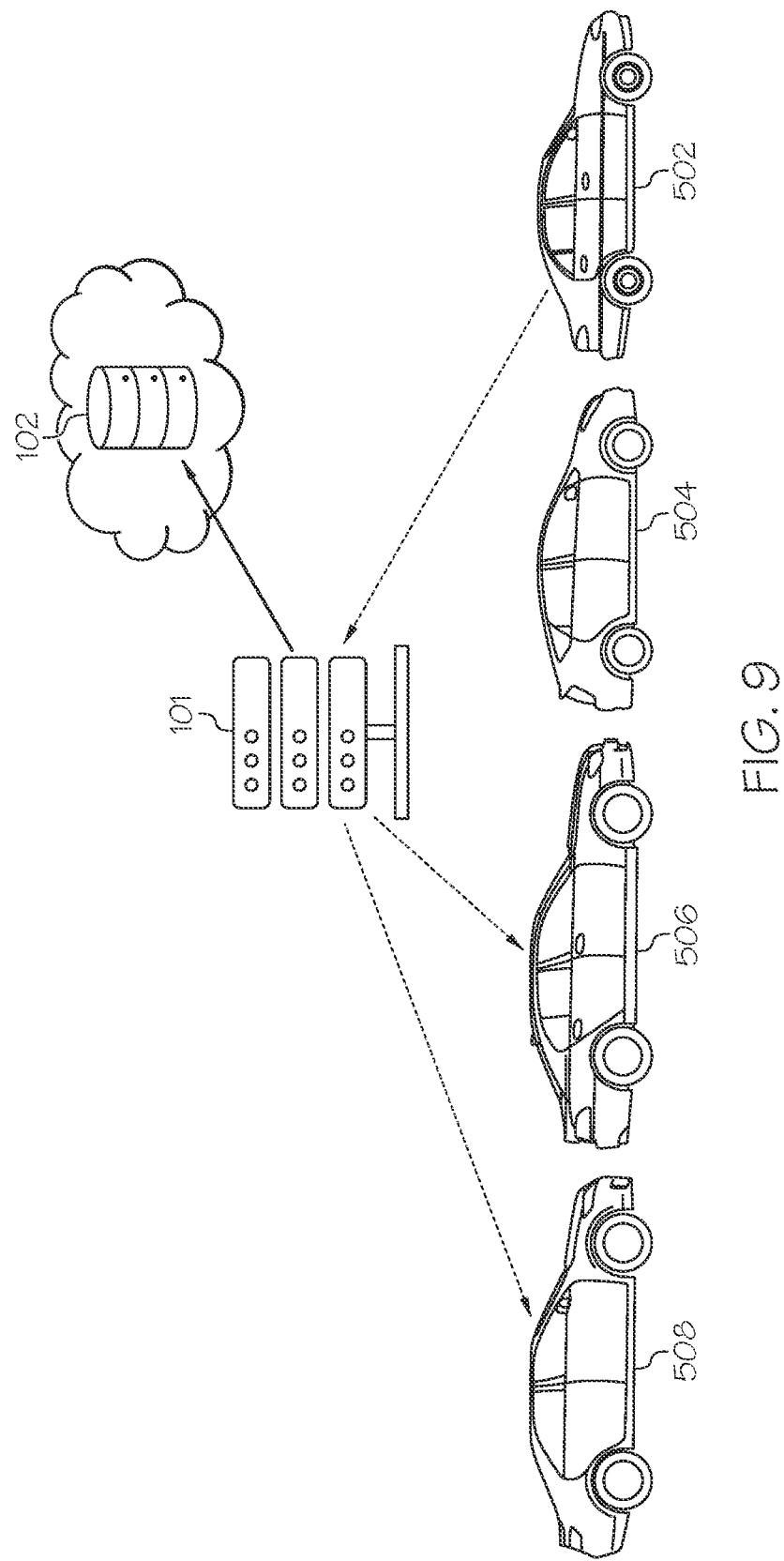
FIG. 9 illustrates a lead vehicle of a vehicle platoon transmitting vehicle data to the server of FIG. 1.

FIG. 9 illustrates a situation in which a contract has been negotiated between vehicles 502, 506, and 508 to form a vehicle platoon with vehicle 502 acting as the lead vehicle and vehicles 506 and 508 acting as follower vehicles. In the example of FIG. 9, vehicle 504 did not join the contract and, thus, is not part of the vehicle platoon. After the contract is agreed to, vehicle 502 transmits C-ACC messages to the edge server 101, which are then relayed to the vehicles 506 and 508. Because vehicle 504 is not part of the vehicle platoon, it does not receive the C-ACC messages. However, when the vehicle platoon is formed, vehicle 504 is positioned between vehicles 502 and 506. Accordingly, vehicle 504 may still follow vehicle 502 using its own vehicle sensors to navigate without the benefit of the C-ACC messages. If vehicle 504 changes lanes, vehicles 506 and 508 may then get closer to the lead vehicle 502 and may continue to navigate using the received C-ACC sensors.

Figure 10:
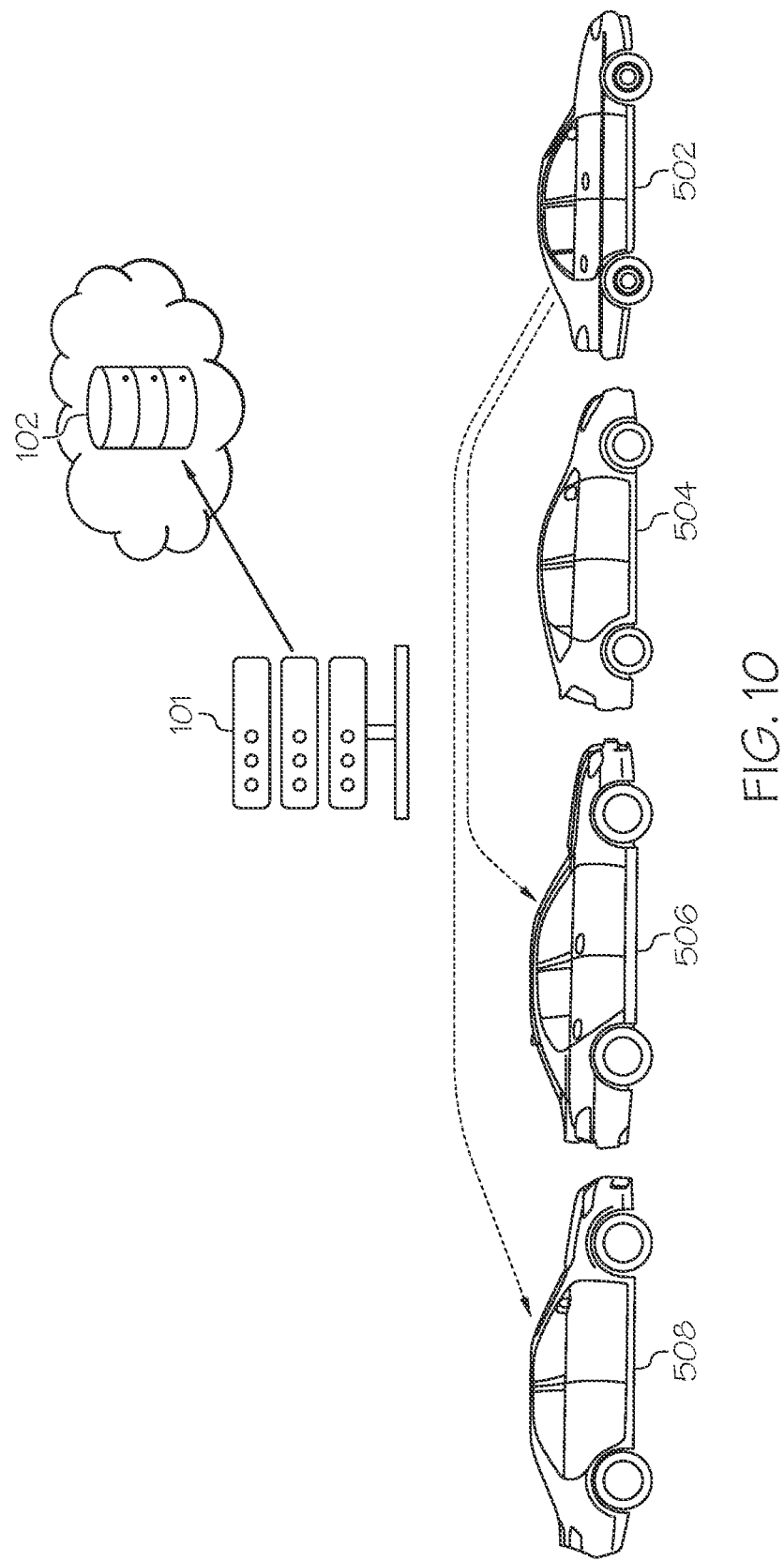
FIG. 10 illustrates a lead vehicle of a vehicle platoon transmitting vehicle data directly to follower vehicles of the vehicle platoon.

FIG. 10 illustrates an example similar to FIG. 9. However, in the example of FIG. 10, the lead vehicle 502 transmits C-ACC messages directly to the vehicles 506 and 508 without the messages being relayed through the edge server 101.

Figure 11:
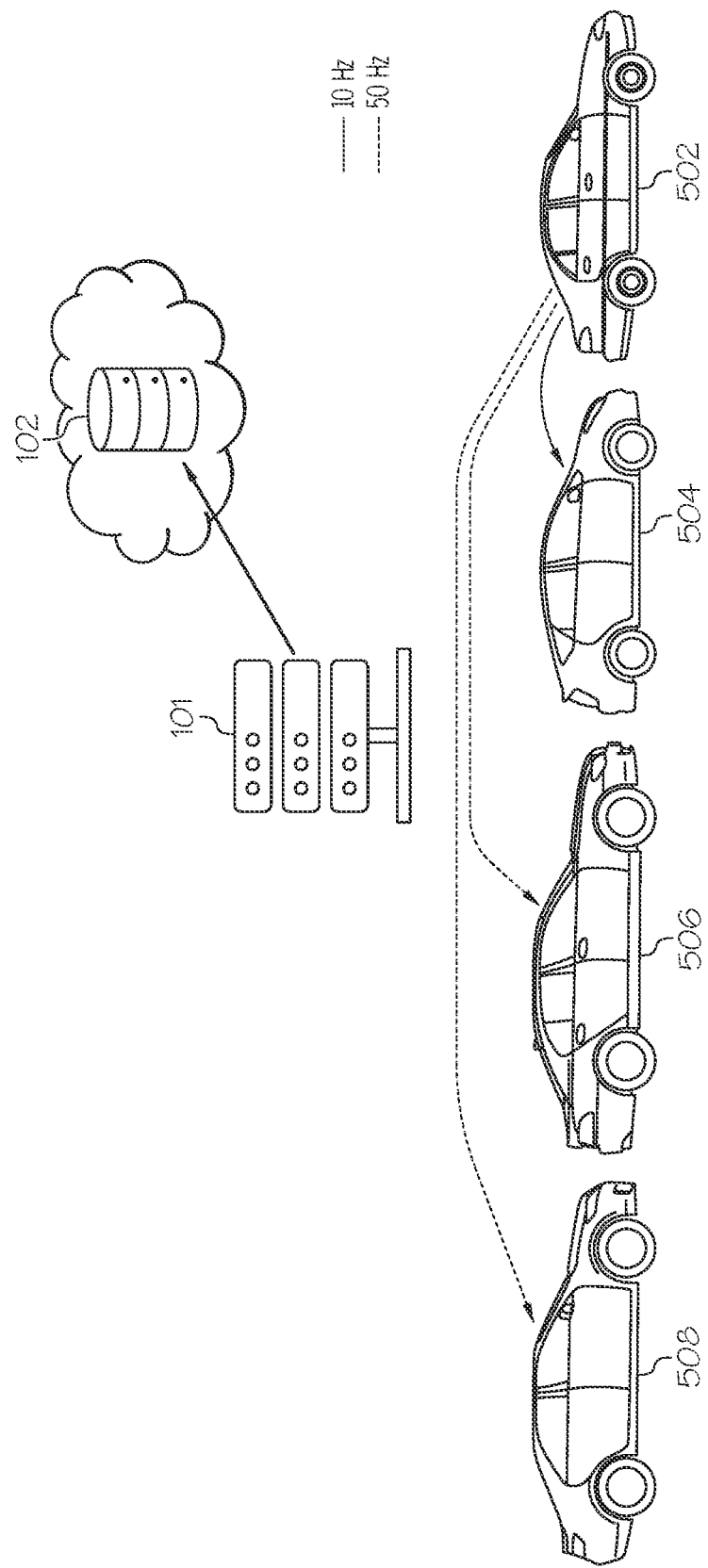
FIG. 11 illustrates a lead vehicle of a vehicle platoon transmitting vehicle data to different follower vehicles of a platoon at different frequencies.

FIG. 11 illustrates an example where vehicles 502, 504, 506, and 508 have all agreed to a contract to form a vehicle platoon. However, vehicle 504 has agreed to a service profile to receive data of lower quality. Thus, in the example of FIG. 11, the lead vehicle 502 transmits C-ACC messages to vehicle 504 at a frequency of 10 Hz and transmits C-ACC messages to vehicles 506 and 508 at a frequency of 50 Hz.

Once the vehicles have assembled the platoon, the lead vehicle may continue to transmit C-ACC messages, which the follower vehicles may utilize to maintain the platoon. If one of the follower vehicles leaves the vehicle platoon, in some examples, the remainder of the vehicles may continue to operate under the same contract terms. In other examples, if one of the follower vehicles leaves the vehicle platoon, the contract negotiation module 318 may attempt to negotiate a new contract for the remaining vehicles, using the techniques described above. Similarly, if the lead vehicle leaves the vehicle platoon, the contract negotiation module 318 may attempt to negotiate a new contract among the follower vehicles. In this case, one of the follower vehicles will take over as the lead vehicle of the platoon.

If the platoon request reception module 316 receives a request from a vehicle to join a vehicle platoon when a platoon already exists in the vicinity of the requesting vehicle (e.g., within a predetermined threshold distance), the contract negotiation module 318 may modify the contract such that the new requesting vehicle may join the platoon. In some examples, the terms of the existing contract may remain in place and the new requesting vehicle may join the platoon as a follower vehicle by agreeing to pay a certain amount determine by the contract negotiation module 318. In other examples, the contract negotiation module 318 may attempt to negotiate a new contract for all the vehicles in the existing platoon in addition to the new requesting vehicle. As such, the contract negotiation module 318 may determine new contract terms for all the vehicles of the existing platoon, as well as the new requesting vehicle.

In some examples, the platoon request reception module 316 may receive a request from a vehicle to join a vehicle platoon when two platoons already exist in the vicinity of the requesting vehicle. In this example, the contract negotiation module 318 may determine which platoon would be most beneficial for the new requesting vehicle to join (e.g., would enhance fuel efficiency the most) and may attempt to negotiate a contract for the requesting vehicle to join this platoon. If the contract negotiation module 318 is unable to negotiate a contract for the requesting vehicle to join the most beneficial platoon, the contract negotiation module 318 may then attempt to negotiate a contract for the requesting vehicle to join a different vehicle platoon.

Figure 12:
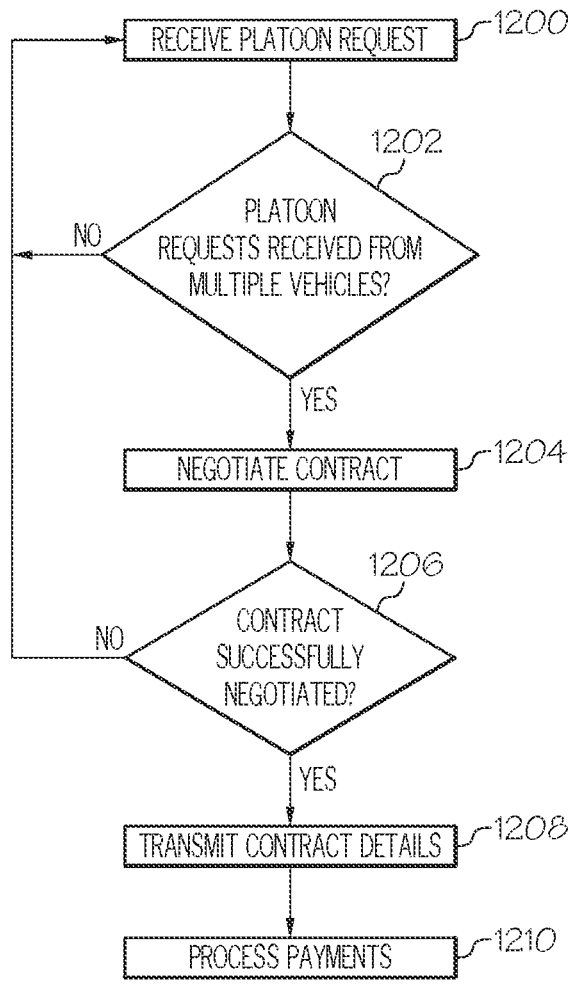
FIG. 12 depicts a flowchart of a method for operating the edge server of FIGS. 1 and 3, according to one or more embodiments shown and described herein.

FIG. 12 depicts a flowchart of a method for operating the edge server 101 of FIGS. 1 and 3. At step 1200, the platoon request reception module 316 receives a platoon request from one or more vehicles. Data associated with the platoon request may be stored in the database 312.

At step 1202, the platoon request reception module 316 determines whether requests to form a vehicle platoon have been received from multiple vehicles located within the vicinity of each other (e.g., two or more vehicles within a predetermined threshold distance). If the platoon request reception module 316 has not received requests to join a vehicle platoon from multiple vehicles within the vicinity of each other (No at step 1202), then control returns to step 1200. If the platoon request reception module 316 has received requests to join a vehicle platoon from multiple vehicles within the vicinity of each other (Yes at step 1202), then control advances to step 1204.

At step 1204, the contract negotiation module 318 attempts to negotiate a contract between the vehicles associated with the received platoon requests, using the techniques described above. The contract negotiation module 318 may attempt to negotiate the contract based on certain constraints associated with each of the vehicles requesting to join a platoon (e.g., as stored in user accounts associated with the vehicles). The contract negotiation module 318 may determine an arrangement of the vehicles in a vehicle platoon and an amount of money that each vehicle in the platoon will pay and/or receive to join the platoon (either as the platoon leader or as a follower vehicle). The contract negotiation module 318 may also determine a service profile for each of the follower vehicles of the platoon (e.g., a frequency at which each follower vehicle will receive C-ACC messages from the lead vehicle).

At step 1206, the contract negotiation module 318 determines whether a contract was successfully negotiated between the two or more of the vehicles that requested to join a vehicle platoon. It may not be possible for the contract negotiation module 318 to negotiate a contract between the requesting vehicles based on constraints associated with them. Alternatively, the contract negotiation module 318 may be able to negotiate a contract between some of the requesting vehicles but not all of the requesting vehicles. If the contract negotiation module 318 is unable to successfully negotiate a contract (No at step 1206), then control returns to step 1200. If the contract negotiation module 318 is able to successfully negotiate a contract (Yes at step 1206), then control advances to step 1208.

At step 1208, the contract transmission module 320 may transmit details of the negotiated contract to the participating vehicles. The details of the contract may include an arrangement of vehicles in a platoon, an amount to be paid by each of the follower vehicles of the platoon, an amount to be paid to the lead vehicle of the platoon, and a service profile for each of the follower vehicles.

At step 1210, the payment facilitation module 322 may process the payments according to the negotiated contract. The participating vehicles may then form and maintain the vehicle platoon. The lead vehicle may transmit vehicle data (e.g., C-ACC messages) to each of the follower vehicles. The transmission rate of vehicle data to each follower vehicle may be based on the service profile for each follower vehicle specified in the contract.

Figure 13:
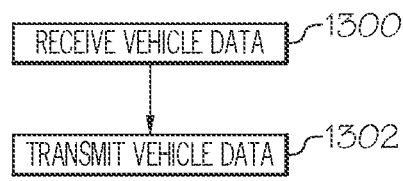
FIG. 13 depicts a flowchart of another method for operating the edge server of FIGS. 1 and 3, according to one or more embodiments shown and described herein.

FIG. 13 depicts a flowchart of a method for operating the edge server 101 of FIGS. 1 and 3 after a contract for forming a vehicle platoon has been agreed to. At step 1300, the vehicle data reception module 324 receives vehicle data (e.g., C-ACC messages) from the lead vehicle of a vehicle platoon. At step 1302, the vehicle data transmission module 326 transmits the received vehicle data to the follower vehicles of the vehicle platoon.

It should now be understood that embodiments described herein are directed to a system and methods for platoon-leader-as-a-service. Autonomous vehicles may transmit requests to join a vehicle platoon to an edge server. When the edge server has received such platoon requests from multiple vehicles within a threshold distance of each other, the edge server may attempt to negotiate a contract between the requesting vehicles for forming a vehicle platoon. The contract may call for a particular arrangement of the vehicles to form the platoon. The contract may further call for the lead vehicle of the platoon to receive a certain amount of money and each of the follower vehicles of the platoon to pay a certain amount of money.

Once the edge server has been negotiated, the edge server may transmit the terms of the contract to the participating vehicles. In some examples, the participating vehicles may have the option of accepting or rejecting the contract. In other examples, the participating vehicles may be deemed to automatically accept the contract. Once the contract is accepted, the edge server may facilitate payments between the participating vehicles as specified in the contract and the participating vehicles may form and maintain the platoon. The lead vehicle may transmit C-ACC messages to the follower vehicles in order to form and maintain the platoon. As such, the follower vehicles may receive better fuel efficiency by joining the vehicle platoon and the lead vehicle may be compensated for being the platoon leader.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
receiving, by a vehicle system of a first vehicle, a first request to join a vehicle platoon from a user;
in response to receiving the first request, presenting an inquiry to the user to select whether the user prefers to arrive at a destination in a shortest time or whether the user prefers to minimize fuel cost;
receiving a response to the inquiry from the user;
receiving, by a server, requests to form a vehicle platoon from a plurality of vehicles including the first vehicle, each request comprising a request to be a lead vehicle or a follower vehicle, a request from the first vehicle being a request to become a platoon leader when the response to the inquiry is a preference to arrive at a destination in a shortest time, and the request from the first vehicle being a request to become a follower vehicle in a platoon when the response to the inquiry is a preference to minimize fuel cost;
determining terms of a contract for the plurality of vehicles to form the vehicle platoon comprising a lead vehicle, selected from among vehicles for which a request was received to be the lead vehicle, and one or more follower vehicles;
transmitting terms of the contract to the plurality of vehicles; and
after the contract has been established between the plurality of vehicles to form the vehicle platoon, exchanging messages, comprising information related to vehicle states, between the plurality of vehicles based on the contract and autonomously navigating the plurality of vehicles, by autonomous driving modules of the plurality of vehicles, to form the vehicle platoon based on sensor data and the exchanged messages,
wherein the terms of the contract comprise:
at least one of the follower vehicles making a payment;
the lead vehicle receiving the payment; and
each of the follower vehicles receiving vehicle data from the lead vehicle according to a unique service profile associated with each follower vehicle.

2. The method of claim 1, wherein the vehicle data comprises a cooperative adaptive cruise control message.

3. The method of claim 1, wherein the vehicle data comprises a basic safety message.

4. The method of claim 1, further comprising:
facilitating the payment to the lead vehicle; and
facilitating the payment from the at least one of the follower vehicle.

5. The method of claim 1, further comprising:
receiving, by the server, the vehicle data from the lead vehicle; and
transmitting by the server, the vehicle data to each of the follower vehicles.

6. The method of claim 1, wherein the terms of the contract comprise an arrangement of the plurality of vehicles in the vehicle platoon.

7. The method of claim 1, wherein the service profile associated with each follower vehicle comprises a frequency at which the follower vehicle receives vehicle data from the lead vehicle.

8. The method of claim 1, further comprising:
determining whether at least two of the plurality of vehicles are within a predetermined threshold distance from each other; and
determining the terms of the contract for the at least two of the plurality of vehicles that are within the predetermined threshold distance from each other.

9. The method of claim 1, further comprising determining the terms of the contract based on constraints associated with one or more of the plurality of vehicles.

10. The method of claim 9, wherein the constraints associated with the one or more of the plurality of vehicles comprise a maximum payment a vehicle is willing to make to be a follower vehicle of the vehicle platoon or a minimum payment a vehicle is willing to accept to be the lead vehicle of the vehicle platoon.

11. The method of claim 1, further comprising determining the terms of the contract based on a fuel efficiency of each of the plurality of vehicles.

12. The method of claim 1, further comprising determining the terms of the contract based on a cost of data transmission.

13. The method of claim 1, further comprising:
receiving a request from an additional vehicle to join the vehicle platoon; and
determining terms of a new contract to form a new vehicle platoon including the additional vehicle.

14. The method of claim 1, further comprising, upon one of the plurality of vehicles leaving the vehicle platoon, determining terms of a new contract to form a new vehicle platoon including the remaining vehicles of the plurality of vehicles.

15. The method of claim 1, further comprising determining an amount to be paid by each of the follower vehicles and an amount to be paid to the lead vehicle such that an expected savings of each of the plurality of vehicles is the same.

16. A system comprising a server and a plurality of vehicles, wherein:
a first vehicle among the plurality of vehicles is configured to:
receive a first request to join a vehicle platoon from a user;
in response to receiving the first request, present an inquiry to the user to select whether the user prefers to arrive at a destination in a shortest time or whether the user prefers to minimize fuel cost; and
receive a response to the inquiry from the user; and
the server comprises a controller configured to:
receive requests to form a vehicle platoon from the plurality of vehicles including the first vehicle, each request comprising a request to be a lead vehicle or a follower vehicle, a request from the first vehicle being a request to become a platoon leader when the response to the inquiry is a preference to arrive at a destination in a shortest time, and the request from the first vehicle being a request to become a follower vehicle in a platoon when the response to the inquiry is a preference to minimize fuel cost; and
determine terms of a contract for the plurality of vehicles to form the vehicle platoon comprising a lead vehicle, selected from among vehicles for which a request was received to be the lead vehicle, and one or more follower vehicles, and
wherein, after the contract has been established between the plurality of vehicles to form the vehicle platoon, the plurality of vehicles are configured to exchange messages, comprising information related to vehicle states, with each other based on the contract and autonomous driving modules of the plurality of vehicles are configured to autonomously navigate, by autonomous driving modules of the plurality of vehicles, to form the vehicle platoon based on sensor data and the exchanged messages,
wherein the terms of the contract comprise:
at least one of the follower vehicles making a payment;
the lead vehicle receiving the payment; and
each of the follower vehicles receiving vehicle data from the lead vehicle according to a unique service profile associated with each follower vehicle.

17. The server of claim 16, wherein the controller is further configured to:
facilitate the payment to the lead vehicle; and
facilitate the payment from the at least one of the plurality of vehicles.

18. The server of claim 16, wherein the controller is further configured to:
receive the vehicle data from the lead vehicle; and
transmit the vehicle data to each of the follower vehicles.

19. The server of claim 16, wherein the service profile associated with each follower vehicle comprises a frequency at which the follower vehicle receives vehicle data from the lead vehicle.

* * * * *

UNITED STATES PATENT AND TRADEMARK OFFICE
CERTIFICATE OF CORRECTION

Page 1 of 1

PATENT NO. : 12,321,179 B2
APPLICATION NO. : 17/161868
DATED : June 3, 2025
INVENTOR(S) : Akila C. Ganlath, Nejib Ammar and Prashant Tiwari It is certified that error appears in the above-identified patent and that said Letters Patent is hereby corrected as shown below:

On the Title Page

On page 2, Column 1, item (56), U.S. patent documents, cite no. 22, delete "Brahim et al." and insert --Ibrahim et al.--, therefor.

Signed and Sealed this
Twenty-second Day of July, 2025

Coke Morgan Stewart
*Acting Director of the United States Patent and Trademark Office*